UNITED STATES PATENT OFFICE.

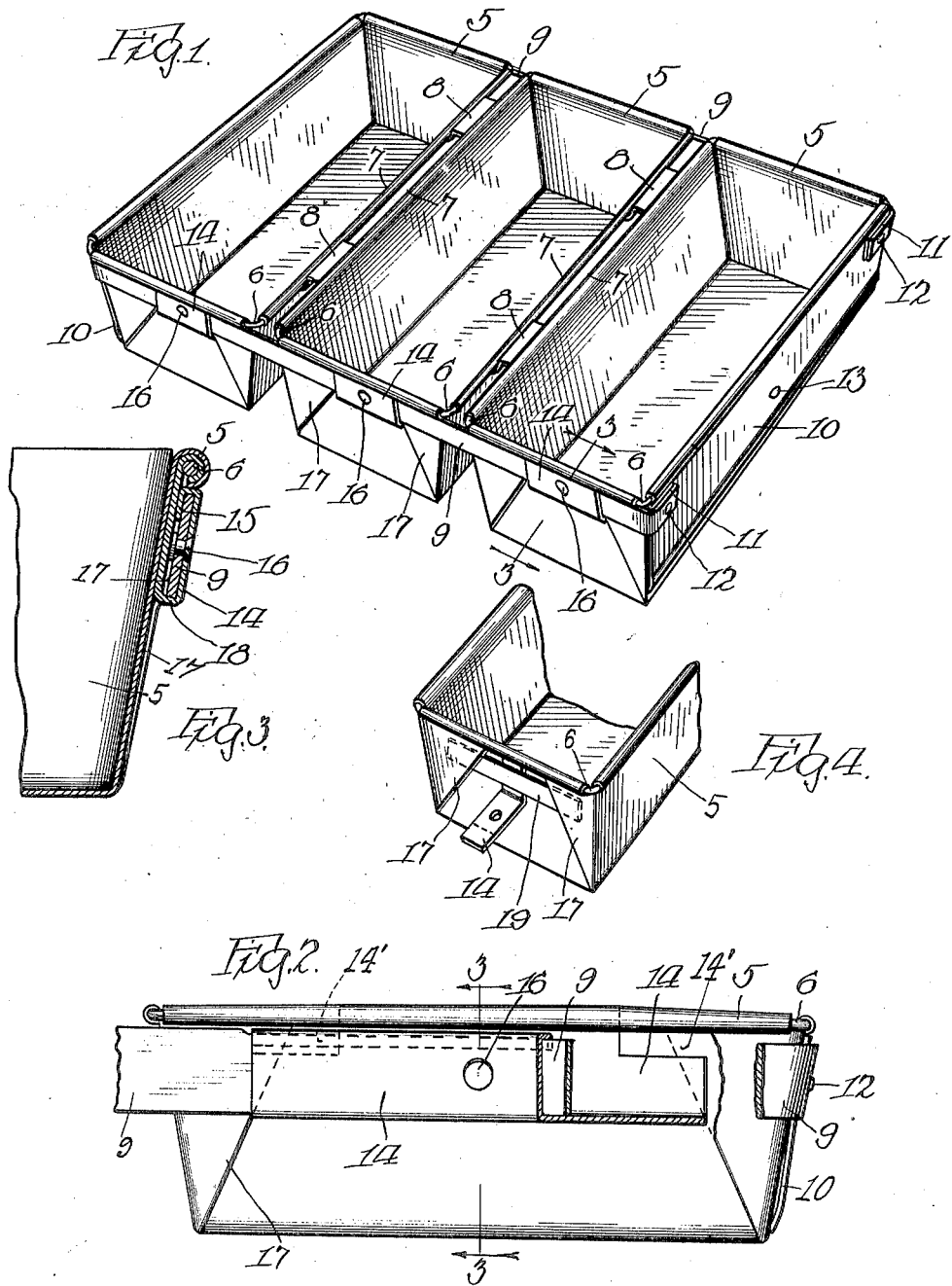

JOSEPH GEORGE JACKSON, OF CHICAGO, ILLINOIS, ASSIGNOR TO EDWARD KATZINGER COMPANY, OF CHICAGO, ILLINOIS, A CORPORATION OF ILLINOIS.

BAKING-PAN.

1,302,663.      Specification of Letters Patent.      Patented May 6, 1919.

Application filed April 26, 1918. Serial No. 230,869.

*To all whom it may concern:*

Be it known that I, JOSEPH GEORGE JACKSON, a citizen of the United States, residing at Chicago, in the county of Cook and State of Illinois, have invented certain new and useful Improvements in Baking-Pans, of which the following is a specification.

My invention relates to multiple baking pans such as used in bake shops, and the like, and the object of this improvement is the provision of a simple and efficient baking pan construction of the character mentioned.

A further object is the production of a baking pan of the character mentioned which is easily kept clean, and which is durable. Other objects will appear hereinafter.

An embodiment of my invention is shown in the accompanying drawing, forming a part of this specification, and in which—

Figure 1 is a perspective view of a multiple baking pan embodying my invention.

Fig. 2 is an enlarged end view of one pan of a multiple baking pan set with parts broken away to show underlying portions.

Fig. 3 is a section as taken on line 3—3 of both Figs. 1 and 2; and

Fig. 4 is a perspective view of a portion of an individual pan showing a modified form of securing member.

Referring more particularly to the drawing, I have shown a multiple baking pan set consisting of three pans secured together in a frame. It will be apparent that when desired a fewer or greater number of pans may be included in a set by increasing or decreasing the lengths of the sides of the pan frame and that multiple pans of various sizes may be accommodated by varying the sizes and materials of the pan frame.

In the form of my invention shown, I have provided a set of three individual baking pans 5 which are of ordinary construction and each provided with an individual wired rim 6. The wires 6 of these pans are turned in the rims in the ordinary manner.

I preferably connect the adjacent rims 7 of the pans at intervals with brace members 8. These bracing members may be of any desirable form and secured in any desirable manner. The form I have shown is substantially the same as that shown in United States Patent No. 1,200,849 issued to Edward Katzinger on October 10, 1916. The function of the brace members 8 is to hold the pan rims 7 at desirable distances apart and to insure there being a space between the pan rims 7 for the circulation of heat between the pans when in use.

Around all of the pans 5 I provide a frame made up of side bars 9 and end plates 10. The top edges of the frame 9—10 preferably rest against the under sides of the rims of the pans, as clearly shown in the drawing. The preferable form of frame shown comprises the bars 9 having their ends turned over on the remote sides of the plates 10. The plates 10 are provided with ears 11 on their ends near their upper corners and fold out on the remote sides of the plates under the ends of the bars 9 and riveted to the latter by rivets 12. It will be apparent, however, that the ears 11 and ends of the bars 9 may be secured in any desirable manner. Ordinarily I do not desire to place rivets through the plates 10 and sides of the outer pans 5, but in some instances this may be desirable, and when it is so desired, one or more rivets 13 may be passed through the plates 10 and adjacent sides of the pans 5.

The pans are secured to the sides 9 of the frame by members 14. Each of the members 14 has one of its ends turned in around one of the wires 6 of a pan 5 under the wall material of the end of such pan, see particularly Fig. 3. The member 14 is then extended down behind the side bar 9 and bent up across the outer side of the latter with the other end 15 disposed behind the side bar 9, see particularly Fig. 3. The part of the member 14 on the outside of bar 9 is perforated and a rivet 16 passed through such perforation, and a suitable perforation in the side bar 9 to securely hold the member to the frame side. In many instances the rivet 16 may be dispensed with. This is particularly so if the material in members 14 is somewhat stiff and strong.

In the formation of conventional pans 5, parts of the wall material 17 are folded up in triangular form on the ends of the pans, and the part of the member 14 between the end of the pan and side bar 9 is intended to pass up under these folded portions 17. It is also desirable to form the members 14 in widths so that the bend of such member at the lower edge of the bars 9, as indicated at 18, engages the adjacent edges of the folds 17. This bending of the material at 18 around the side bars 9 and edges of the folds 17 facilitates making a rigid connection between the frame and pans.

In Fig. 2 I have shown a pan construction in which the pans are relatively wider than in Fig. 1, and in this construction the members 14 are increased in width so that they have the same relations to the other parts as just mentioned. In a wide pan construction, such as indicated in Fig. 2, it is desirable to cut away the corners of the members 14, as indicated at 14', where the folded parts 17 of the pan walls engage the ends of the pans. This facilitates making the pan rims at the ends of the pans of minimum size and to correspond with the rims at the sides of the pans.

In Fig. 4 I have shown a modified form of the member 14 in that this member is formed narrower than the space between the folds 17, but secured to the pan end and frame 9 in the same manner as already described. In this construction I find it desirable to place a strip of material 19 with its ends under the folds 17 and over the inner end portion below the wired rim of the member 14, as clearly indicated in Fig. 4. This helps to hold the member 14 and insures more rigidity in the joint where the member 14 is made narrower than the distance between the folds 17 as above mentioned. In Fig. 4 the member 14 is not shown as in a complete state, but only partially folded in order to clearly show the relation of member 19 to the construction.

While I have illustrated and described the preferred form of my invention, I do not desire to be limited to the precise details set forth, but desire to avail myself of such variations and changes as come within the scope of the appended claims.

I claim:—

1. A multiple baking pan comprising a plurality of individual pans; bars disposed along the ends of said individual pans; and members having portions disposed between parts of the rims of the ends of said individual pans, and portions disposed around both sides and both edges of said bars.

2. A multiple baking pan comprising a plurality of individual pans each having a wired rim; bars extending along the ends of said individual pans close up under said wired rims; and sheet material pieces, each having a part disposed in the rims at the ends of one of said pans and another part extending across one side, the lower edge, the other side and top edge of one of said bars.

3. A multiple baking pan comprising a plurality of individual pans each having a wired rim; a frame extending around said individual pans close up under the wired rims thereof; and members turned in around the wires under the wall material at the ends of the pans and wrapped around the frame sides at the ends of the pans.

4. A multiple baking pan comprising a plurality of individual pans each having a wired rim; a frame extending around said individual pans close up under the wired rims thereof; members turned in around the wires under the wall material at the ends of the pans and wrapped around the frame sides at the ends of the pans; and rivets passing through the sides of the frame and the portions of said members wrapped around said frame sides.

5. A multiple baking pan comprising a plurality of individual pans each having a wired rim and portions of the material of its walls folded flat against the outer sides of the pan ends in triangular form; a frame extending around all of said pans; and sheet material members turned in the wired rims of the pans at the ends of the latter and wrapped around the sides of said frame, there being portions of said members of lengths to engage the adjacent edges of the triangular portions of the wall material folded on the ends of the pans.

6. A multiple baking pan comprising a plurality of pans each having a wired rim and portions of its wall material folded in triangular form flat against the outer sides of the pan ends; a frame extending around all of the individual pans close to their wired rims; and members having parts disposed between the wires and pan wall material at the ends of the pans, said members extending down between the pan ends and the sides of the frame and up over the outer sides of the latter with the edges of said members folded over the tops of the frame sides.

7. A multiple baking pan comprising a plurality of pans each having a wired rim and portions of its wall material folded in triangular form flat against the outer sides of the pan ends; a frame extending around all of the individual pans close to their wired rims; members turned in between the wires and pan wall material at the ends of the pans with corner portions of said members cut away where the latter passes around said wires, said members extending down between the pan ends and the sides of the frame and up over the outer sides of the latter with the edges of said members folded over the tops of the frame sides; and rivets passing through said members and the frame sides.

8. A multiple baking pan comprising a plurality of individual pans each having a wired rim and portions of the material of its wall folded flat against the outer sides of the pan ends in triangular form; a frame extending around all of said pans; narrow sheet members having their ends turned in between the wires and pan wall material at the ends of the pans, said narrow members extending around and riveted to the side of said frame; and sheet strips having their ends clamped between the ends of the pans and the triangular portions of the wall material folded on the ends of the pans and their central portions passing between the narrow sheet members and the sides of the frame.

9. A multiple baking pan comprising a plurality of pans each having a wired rim and portions of its wall material folded flat against the outer sides of the pan ends; bars extending along the ends of said pans close to their wired rims; and members turned in between the wires and pan wall material at the ends of the pans with corner portions of said members extending between the pan ends and the wall material folded on said pan ends.

10. A multiple baking pan comprising a plurality of individual pans each having a wired rim and portions of the wall material folded flat against the outer sides of the pan ends; bars extending along the ends of the pans; comparatively narrow sheet members turned in between the wires and pan wall material at the ends of the pans, said narrow members being secured to said bars; and strips disposed across the outer sides of said narrow sheet members with their ends extending under the wall material folded on the ends of the pans holding said narrow sheet members tightly against the pan ends.

In testimony whereof I have signed my name to this specification on this 20th day of April, A. D. 1918.

JOSEPH GEORGE JACKSON.